United States Patent
Kudo

(10) Patent No.: US 10,365,590 B2
(45) Date of Patent: Jul. 30, 2019

(54) BELT CONVEYANCE DEVICE AND IMAGE FORMING APPARATUS

(71) Applicant: CANON KABUSHIKI KAISHA, Tokyo (JP)

(72) Inventor: Ran Kudo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/118,091

(22) Filed: Aug. 30, 2018

(65) Prior Publication Data

US 2019/0094762 A1 Mar. 28, 2019

(30) Foreign Application Priority Data

Sep. 27, 2017 (JP) .................. 2017-186697

(51) Int. Cl.
| | | |
|---|---|---|
| *G03G 15/16* | (2006.01) | |
| *B65G 39/16* | (2006.01) | |
| *G03G 15/00* | (2006.01) | |
| *G03G 15/01* | (2006.01) | |

(52) U.S. Cl.
CPC ......... *G03G 15/1615* (2013.01); *B65G 39/16* (2013.01); *G03G 15/0189* (2013.01); *G03G 15/50* (2013.01); *G03G 15/754* (2013.01); *G03G 2215/00156* (2013.01)

(58) Field of Classification Search
CPC ....... G03G 15/751; G03G 2215/00156; G03G 15/161; G03G 15/1615; G03G 15/0189; G03G 2215/00151; G03G 2215/00168; G03G 2215/00143; B65G 39/16
See application file for complete search history.

(56) References Cited

U.S. PATENT DOCUMENTS

| | | | | |
|---|---|---|---|---|
| 5,659,851 A * | 8/1997 | Moe | ...................... | B65G 39/16 226/15 |
| 6,141,522 A * | 10/2000 | Tsuruoka | ............. | G03G 15/755 198/804 |
| 6,970,674 B2 * | 11/2005 | Sato | .................... | G03G 15/1615 198/806 |
| 8,837,989 B2 * | 9/2014 | Yasumoto | ............ | G03G 15/161 399/165 |
| 2007/0258741 A1 * | 11/2007 | Kim | .................... | G03G 15/2053 399/329 |
| 2010/0158568 A1 * | 6/2010 | Yasumoto | .......... | G03G 15/0131 399/165 |
| 2017/0137229 A1 * | 5/2017 | DeVries | ................. | B65G 15/64 |

FOREIGN PATENT DOCUMENTS

| | | |
|---|---|---|
| JP | H09169449 A | 6/1997 |
| JP | 2001-146335 A | 5/2001 |
| JP | 2001520611 A | 10/2001 |
| JP | 2008-096694 A | 4/2008 |
| JP | 2017-009785 A | 1/2017 |
| JP | 2017009785 A * | 1/2017 |

* cited by examiner

*Primary Examiner* — Francis C Gray
(74) *Attorney, Agent, or Firm* — Canon U.S.A., Inc. IP Division

(57) ABSTRACT

The belt conveyance device includes an endless belt member, and a steering roller that stretches the belt member and has a tiltable rotation axis. The steering roller includes a roller that slides on the belt member and rubbing members that rub against the belt member at both ends of the roller. One or a plurality of recessed portions is formed in the surface of each rubbing member in an area where the surface of the rubbing member is opposed to an inner surface of the belt member.

8 Claims, 11 Drawing Sheets

NORMAL STATE

SHIFTED TO LEFT

SHIFTED TO RIGHT

STRAIGHT SHAPE

TAPERED SHAPE

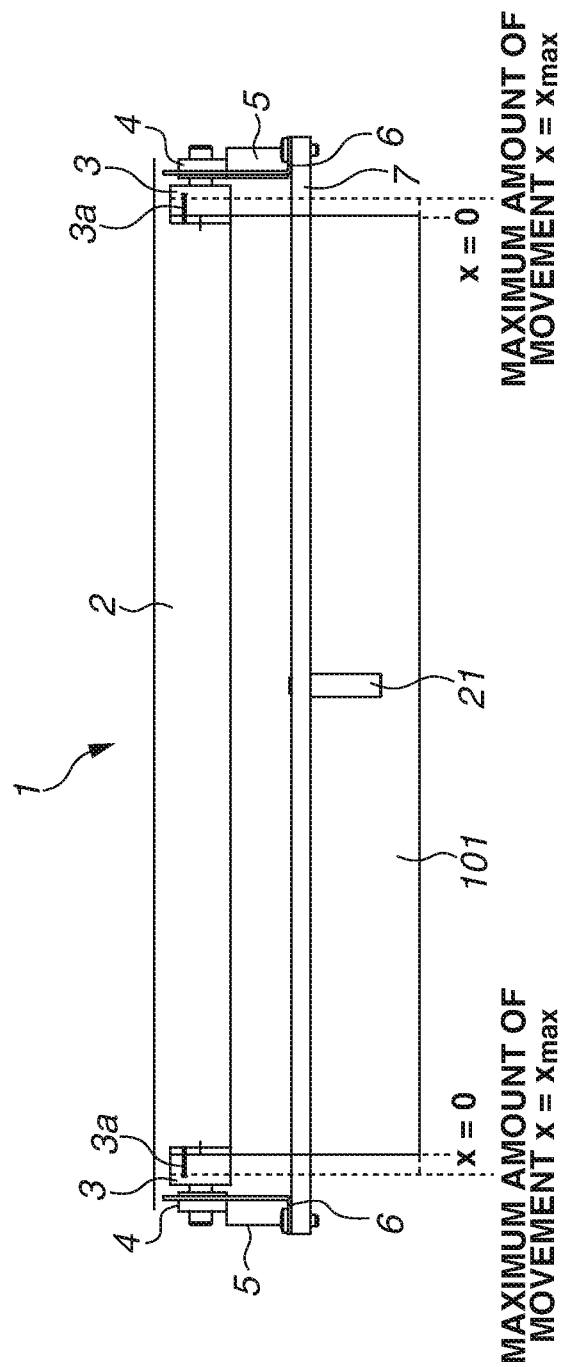

BELT CONVEYANCE DEVICE AND IMAGE FORMING APPARATUS

BACKGROUND OF THE INVENTION

Field of the Invention

The disclosure relates to a belt conveyance device and an image forming apparatus including a belt conveyance device.

Description of the Related Art

An image forming apparatus that forms a toner image, transfers the toner image to a recording material, and heats and presses the toner image-transferred recording material to fix the image have been widely used. As such an image forming apparatus, there is a type of image forming apparatus that performs image formation by using a belt member (intermediate transfer belt, recording material conveyance belt, transfer belt, fixing belt, or pressure belt). The belt member is stretched and turned around a plurality of stretching rollers. When the belt member is driven to turn around, a widthwise position of the belt member sometimes shifts toward an end of the belt. There has been known a configuration in which a belt is stretched by a steering roller and a lateral movement control (hereinafter, also referred to as a steering control) of the belt is performed by tilting the steering roller.

The steering control of a belt member is typically performed by a forced steering system in which a shifted position of the belt member is detected by a sensor and the steering roller is forcefully tilted externally using a motor based on the detection result of the sensor (see Japanese Patent Application Laid-Open No. 9-169449). Meanwhile, there is a configuration called an autonomous steering system (hereinafter, also referred to as automatic belt alignment) in which the widthwise position of the belt member is controlled without external driving (see Japanese Patent Application Laid-Open No. 2001-146335 and Japanese Unexamined Patent Application Publication (Translation of PCT Application) No. 2001-520611). In such a configuration, the steering roller tilts autonomously to steer the belt member according to the shifted position of the belt member.

An image forming apparatus discussed in Japanese Unexamined Patent Application Publication (Translation of PCT Application) No. 2001-520611 includes a pair of steering roller support members tiltably arranged to a frame member that rotatably supports a driving roller member. A steering roller is rotatably attached to the pair of steering roller support members. If the belt member shifts, amounts of overlapping of rubbing members, which are provided at both ends of the steering roller, with the belt member vary. This changes a rotational load moment on the left and right of the steering roller about a rotation axis of the steering roller support members. According to the change in the rotational load moment, the steering roller autonomously tilts to laterally move the belt member.

To avoid an abrupt alignment operation, the automatic belt alignment discussed in Japanese Unexamined Patent Application Publication (Translation of PCT Application) No. 2001-520611 often uses a configuration in which the belt member is in a state of always overlapping either of the rubbing members at both ends of the steering roller. If the belt member and the rubbing members are configured to constantly continue rubbing against each other, shavings can occur in the rubbing portions after a long period of rubbing. In particular, if the rubbing members are made of resin, the rubbing members may be shaved by the rubbing against the belt member. If the belt member and the rubbing members constantly continue the rubbing, an inner surface of the belt member may also be shaved, thereby causing a similar problem. Such shavings can be transported to an image forming unit and cause an image defect.

SUMMARY OF THE INVENTION

The disclosure is directed to providing a belt conveyance device and an image forming apparatus that can suppress spreading of shavings, if any, occurring between rubbing members provided at both ends of a steering roller and a belt member.

According to an aspect of the disclosure, a belt conveyance device includes an endless belt member configured to turn around, and a steering roller configured to be tiltable and stretch the belt member, the steering roller including a roller configured to be rotatable with the belt member and a rubbing member configured to rub against the belt member to apply frictional force to the belt member, rotation of the rubbing member being regulated at both ends of the steering roller, the steering roller being tilted by frictional force acting on the rubbing member from the belt member, wherein the rubbing member includes a recessed portion formed along an axial direction of the steering roller in an area opposing an inner peripheral surface of the belt member, and wherein a width of the recessed portion with respect to a circumferential direction of the steering roller is 300 μm or more and a depth of the recessed portion is 100 μm or more.

According to another aspect of the disclosure, an image forming apparatus includes an endless belt member configured to bear an image and turn around, and a steering roller configured to be tiltable and stretch the belt member, the steering roller including a roller configured to be rotatable with the belt member and a rubbing member configured to rub against the belt member to apply frictional force to the belt member, rotation of the rubbing member being regulated at both ends of the steering roller, the steering roller being tilted by frictional force acting on the rubbing member from the belt member, wherein the rubbing member includes a recessed portion formed along an axial direction of the steering roller in an area opposed to an inner peripheral surface of the belt member, and wherein a width of the recessed portion with respect to a circumferential direction of the steering roller is 300 μm or more and a depth of the recessed portion is 100 μm or more.

Further features and aspects of the disclosure will become apparent from the following description of numerous example embodiments with reference to the attached drawings.

BRIEF DESCRIPTION OF THE DRAWINGS

FIG. 10 is a diagram illustrating the trapping portions according to the first example embodiment.

DESCRIPTION OF THE EMBODIMENTS

Numerous example embodiments of the disclosure will be described in detail below with reference to the drawings. Dimensions, materials, shapes, and relative arrangements of components described in the example embodiments are not intended to limit the scope of the disclosure thereto unless otherwise specified.

<Example Image Forming Apparatus>

Figure 1:
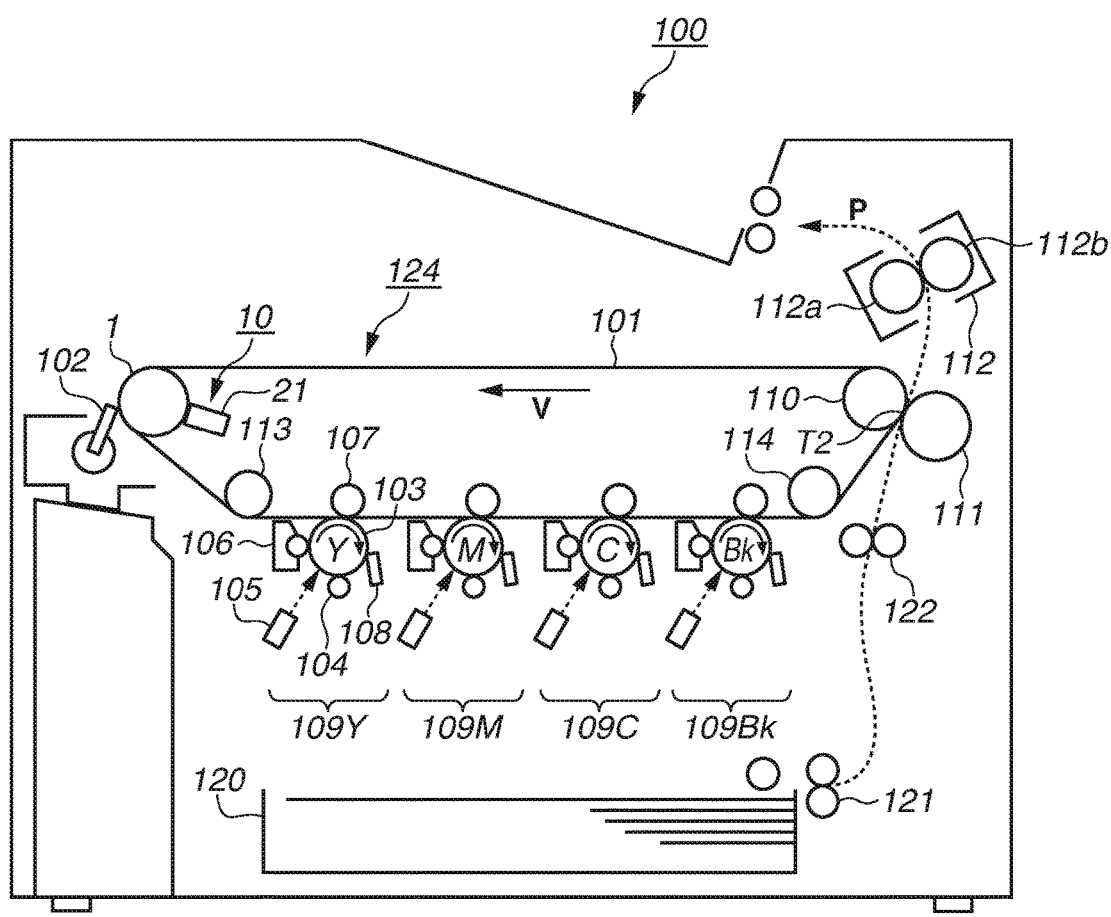
FIG. 1 is a cross-sectional diagram illustrating an example configuration of an image forming apparatus.

FIG. 1 is a cross-sectional diagram illustrating a configuration of an image forming apparatus. As illustrated in FIG. 1, an image forming apparatus 100 is a full color printer of a tandem intermediate transfer system. More specifically, the image forming apparatus 100 according to a first example embodiment includes yellow, magenta, cyan, and black image forming units 109Y, 109M, 109C, and 109Bk, which are arranged along an intermediate transfer belt 101.

In the image forming unit 109Y, as will be described in detail below, a yellow toner image is formed on a photosensitive drum 103, and the yellow toner image is transferred to the intermediate transfer belt 101. In the image forming unit 109M, a magenta toner image is formed using a procedure similar to that for the image forming unit 109Y, and the magenta toner image is transferred and superposed on the yellow toner image on the intermediate transfer belt 101. In the image forming units 109C and 109Bk, a cyan toner image and a black toner image are formed using the procedure similar to that for the image forming unit 109Y, and the cyan and black toner images are successively transferred to the intermediate transfer belt 101 in a superposed manner.

The four color toner images borne on the intermediate transfer belt 101 are conveyed to a secondary transfer portion T2 and are secondarily transferred to a recording material P, collectively. Recording materials P taken out of a recording material cassette 120 are separated into a single sheet by a separation roller 121 and the recording material P is conveyed to a registration roller 122. The registration roller 122 feeds the recording material P to the secondary transfer portion T2 in synchronization with the timing of the toner images on the intermediate transfer belt 101.

A secondary transfer roller 111 makes contact with the intermediate transfer belt 101 on a driving roller 110 to form the secondary transfer portion T2. The recording material P, which is passed through the secondary transfer portion T2 and to which the four toner images are secondarily transferred, is separated from the intermediate transfer belt 101 by curvature and is fed into a fixing device 112. The fixing device 112 heats and presses the recording material P at a nip portion formed between a fixing roller 112a and a pressure roller 112b to fix the toner images to the recording material P. The recording material P, to which the toner images are fixed by the fixing device 112, is discharged from the image forming apparatus 100.

<Example Image Forming Units>

The image forming units 109Y, 109M, 109C, and 109Bk have substantially the same configuration except that their developing devices use toner of different colors of yellow, magenta, cyan, and black, respectively. The formation process of a toner image in the yellow image forming unit 109Y will be described below. Redundant descriptions of the other image forming units 109M, 109C, and 109Bk will be omitted.

The image forming unit 109Y includes a charging roller 104, an exposure device 105, a developing device 106, a primary transfer roller 107, and a drum cleaning device 108 that are arranged around the photosensitive drum 103. A photosensitive layer is formed on a surface of the photosensitive drum 103. The photosensitive drum 103 rotates in a direction of an arrow at a predetermined process speed. The charging roller 104 charges the surface of the photosensitive drum 103 with a uniform potential. The exposure device 105 scans the surface of the photosensitive drum 103 with a laser beam using a rotating mirror to write an electrostatic image of an image thereon. The developing device 106 transfers toner to the photosensitive drum 103 to develop the electrostatic image into a toner image. The primary transfer roller 107, to which a voltage is applied, transfers the toner image borne on the photosensitive drum 103 to the intermediate transfer belt 101. The drum cleaning device 108 includes a cleaning blade to rub against the photosensitive drum 103 to collect transfer residual toner remaining on the photosensitive drum 103.

<Example Intermediate Transfer Unit>

As illustrated in FIG. 1, the driving roller 110 stretches and drives the intermediate transfer belt 101, which is an example of an endless belt member. A frame stay (not illustrated) is a part of a frame member that rotatably supports the driving roller 110. The frame stay, the intermediate transfer belt 101, the driving roller 110, a steering roller 1, stretching rollers 113 and 114, and the primary transfer rollers 107 are integrally assembled into an intermediate transfer unit 124 that is an example of an interchangeable unit. The intermediate transfer unit 124 can be integrally detached from a casing structure of the image forming apparatus 100.

The intermediate transfer belt 101 is stretched around the driving roller 110, the steering roller 1, the stretching rollers 113 and 114, and the primary transfer rollers 107. The driving roller 110 also functions as a secondary transfer inner roller that sandwiches the intermediate transfer belt 101 with the secondary transfer roller 111 to form the secondary transfer portion T2. The steering roller 1 also functions as a tension roller for applying predetermined tension to the intermediate transfer belt 101.

The intermediate transfer belt 101 is configured of a resin belt having a polyimide (PI) base layer. The intermediate transfer belt 101 has a tensile modulus of elasticity E=18000 N/cm$^2$ and a thickness of 0.08 mm. The intermediate transfer belt 101 is desirably made of a high rigidity resin such as polyvinylidene difluoride (PVDF), polyamide, PI resin, polyethylene terephthalate (PET), and polycarbonate (PC). The thickness of the intermediate transfer belt 101 desirably ranges from 0.02 mm to 0.50 mm. If the thickness is too small, the intermediate transfer belt 101 fails to provide sufficient durability against abrasion. If the thickness is too large, the intermediate transfer belt 101 becomes less bendable around the driving roller 110, the steering roller 1, and the stretching rollers 113 and 114 and can cause deformation and a fold.

<Example Autonomous Steering Mechanism>

Figure 2A:
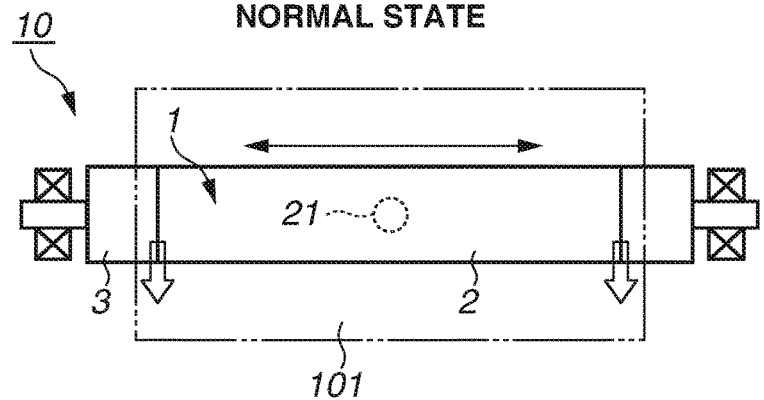
FIGS. 2A, 2B, and 2C are diagrams illustrating an example operation of an autonomous steering mechanism.
Figure 2B:
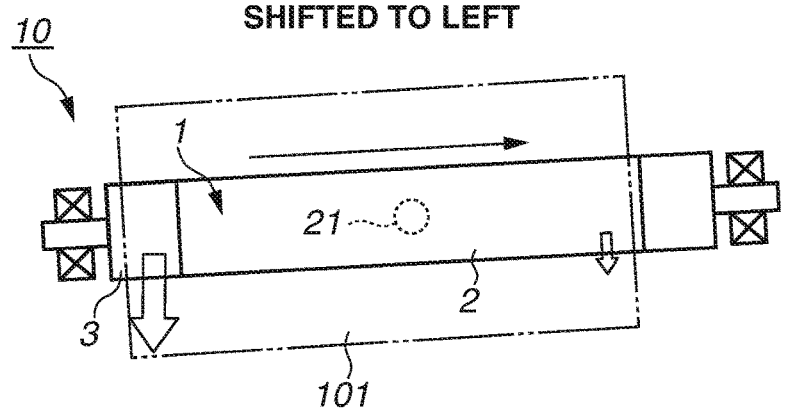
Figure 2C:
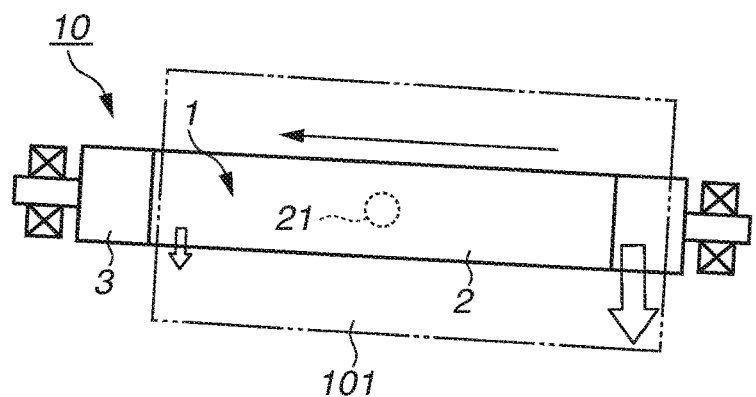
Figure 3:
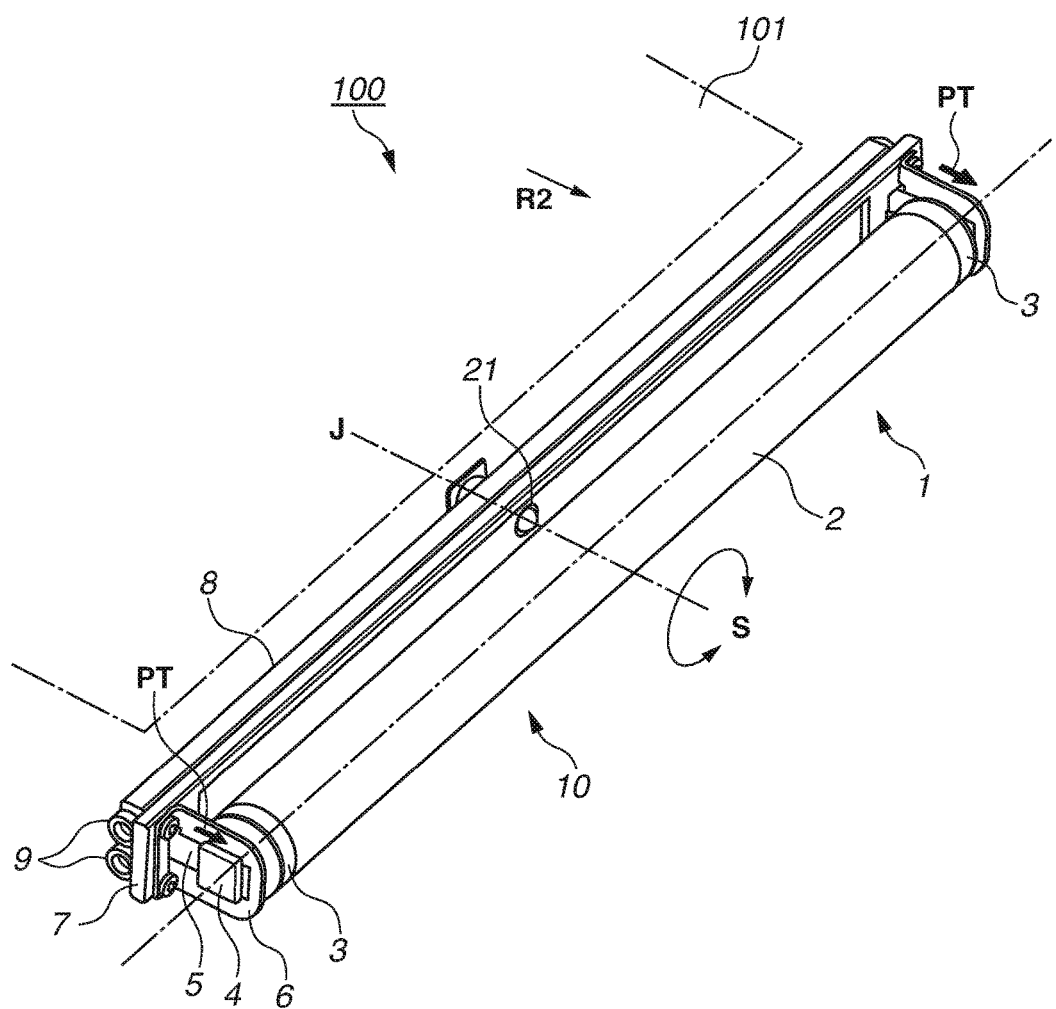
FIG. 3 is a perspective view of the autonomous steering mechanism.

FIGS. 2A, 2B, and 2C are diagrams illustrating an operation of an autonomous steering mechanism. FIG. 3 is a perspective view of the autonomous steering mechanism.

As illustrated in FIG. 2A, an autonomous steering mechanism 10 includes the steering roller 1 that tilts autonomously based on a balance between frictional forces at both ends to laterally move the intermediate transfer belt 101. The steering roller 1 is supported to be tiltable about a steering shaft 21, which crosses the rotation axis of the steering roller 1. In other words, the steering roller 1 maintains the widthwise position of the intermediate transfer belt 101 within a predetermined range by tilting about the steering shaft 21. If both ends of the intermediate transfer belt 101 overlap equally with left and right rubbing members 3, the left and right frictional forces acting on the steering roller 1 are equal, and the steering roller 1 does not tilt. As illustrated in FIGS. 2B and 2C, if the intermediate transfer belt 101 is shifted by disturbance, the steering roller 1 tilts in a needed direction as much as needed, whereby the intermediate transfer belt 101 is restored to the state of FIG. 2A.

As illustrated in FIG. 2B, if the intermediate transfer belt 101 is shifted to the left, the intermediate transfer belt 101 greatly overlaps the left rubbing member 3 to increase the frictional force on the left side. The steering roller 1 thus tilts with the left side down. As a result, rightward moving force acts on the intermediate transfer belt 101 wound around the steering roller 1.

As illustrated in FIG. 2C, if the intermediate transfer belt 101 is shifted to the right, the intermediate transfer belt 101 greatly overlaps the right rubbing member 3 to increase the frictional force on the right side. The steering roller 1 thus tilts with the right side down. As a result, leftward moving force acts on the intermediate transfer belt 101 wound around the steering roller 1.

As illustrated in FIG. 3, a center portion of the steering roller 1 excluding both end portions constitutes a rotatable driven roller 2. The driven roller 2 is driven to rotate according to the rotation of the intermediate transfer belt 101. Both end portions of the steering roller 1 constitute the rubbing members 3 that are regulated in rotation. As the intermediate transfer belt 101 turns around, the rubbing members 3 rub against the intermediate transfer belt 101 to cause frictional resistance. Side support members 6 are erected on both end portions of a rotation plate 7. The rotation plate 7 and the side support members 6 constitute a supporting base for supporting the steering roller 1. Slide bearings 4 are fit into slide grooves formed in the side support members 6 and can move in the direction of the arrows PT. The slide bearings 4 rotatably support the ends of the rotation shaft of the steering roller 1. Tension springs (compression springs) 5 bias the slide bearings 4 in the direction of the arrows PT. The steering roller 1, biased by the tension springs 5 at both ends, applies tension to the intermediate transfer belt 101. The rotation plate 7 is rotatable about a rotation axis J at the center in the direction of an arrow S. A frame stay 8 is a member constituting a unit frame of the intermediate transfer unit 124. The frame stay 8 includes slide rollers 9 at both ends. The slide rollers 9 reduce the rotating resistance of the rotation plate 7 on the frame stay 8.

Figure 4:
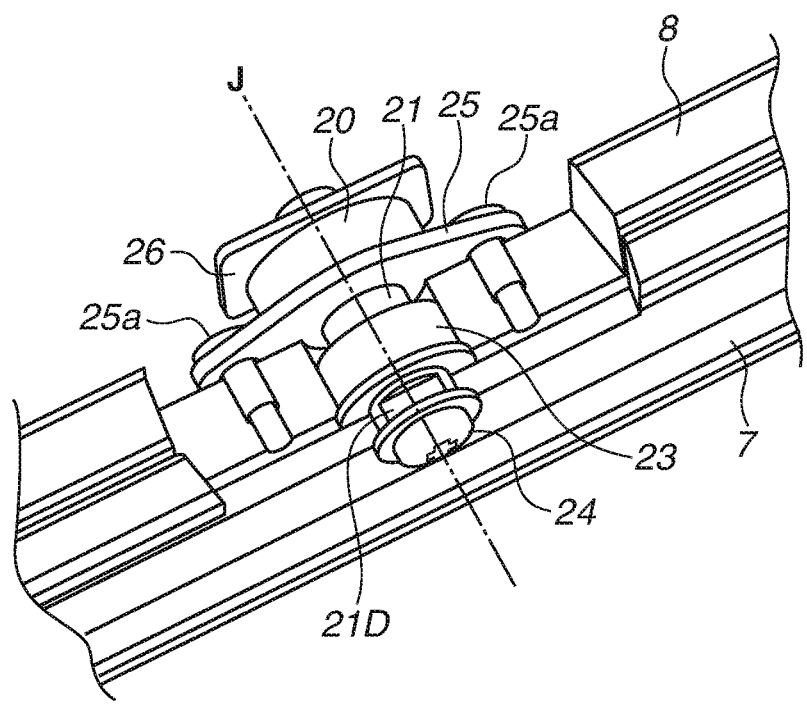
FIG. 4 is a perspective view of a rotation center portion of the autonomous steering mechanism.

FIG. 4 is a perspective view of a rotation center portion of the autonomous steering mechanism.

As illustrated in FIG. 4, the steering shaft 21, which is a rotation shaft having a two-side cutout key portion 21D on one end, is engaged with and integrally fastened to a central portion (center portion) of the rotation plate 7 with a screw 24. The steering shaft 21 is further inserted into and supported by a bearing 23 provided on the frame stay 8. A thrust stopper member 26 is firmly fixed to the other end of the steering shaft 21 via a support member 20, whereby the steering shaft 21 is stopped from coming off. A support member 25 is interposed between the frame stay 8 and the support member 20 with the steering shaft 21 penetrating there through, and is fixed to the frame stay 8 with screws 25a.

<Example Rubbing Members>

Figure 5A:
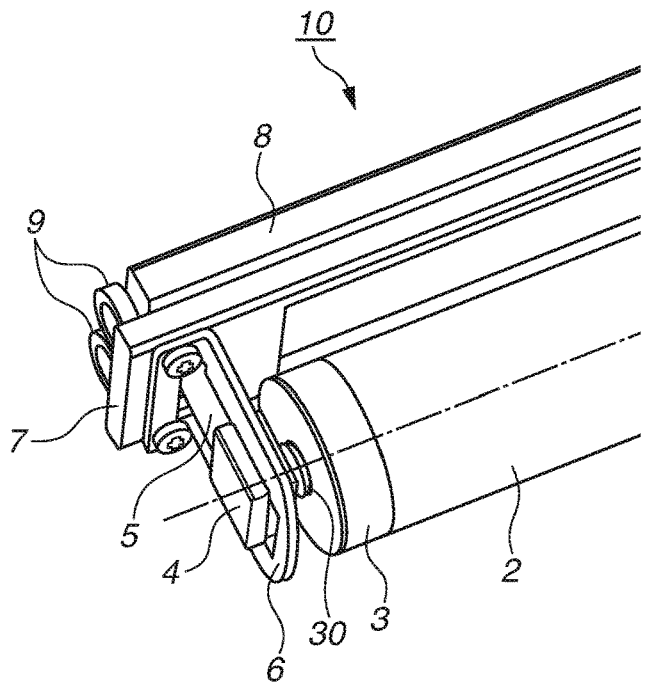
FIGS. 5A and 5B are perspective views of an end portion of an example steering roller.
Figure 5B:
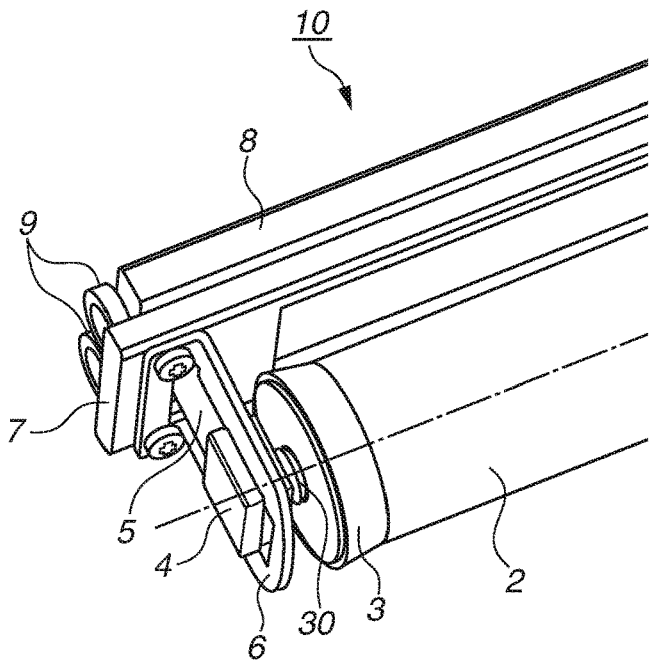
Figure 6A:
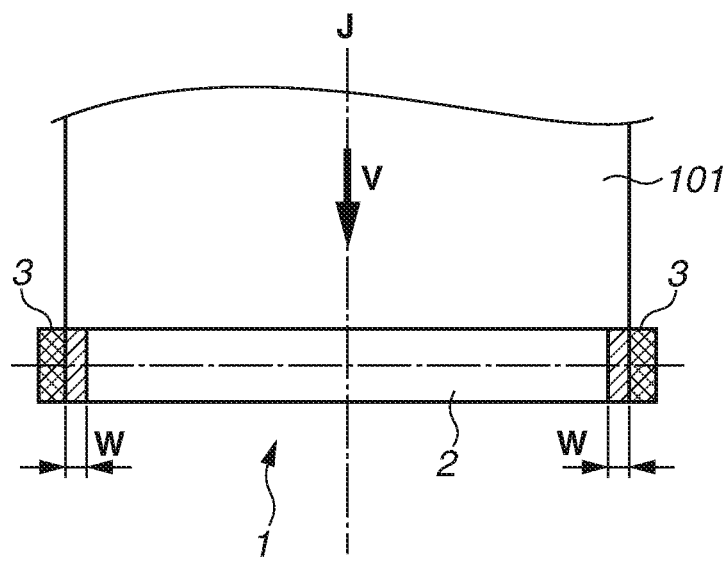
FIGS. 6A and 6B are diagrams illustrating an overlapping width of an intermediate transfer belt with the steering roller.
Figure 6B:
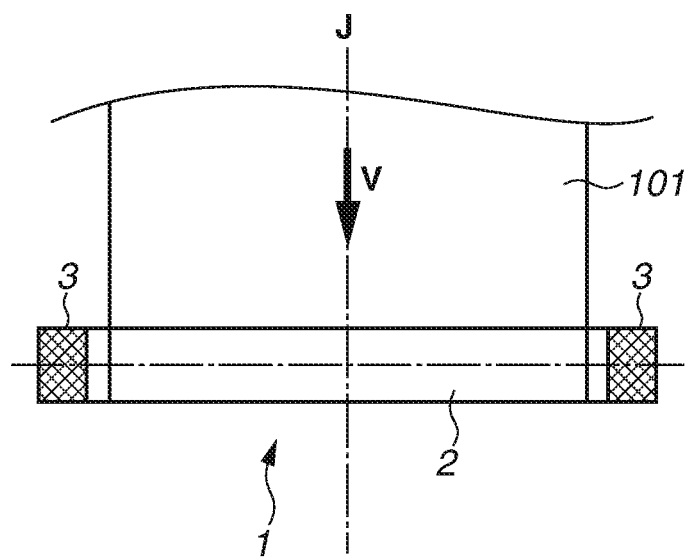

FIGS. 5A and 5B are perspective views of an end portion of the steering roller 1. FIGS. 6A and 6B are explanatory diagrams of an overlapping width of the intermediate transfer belt 101 with the steering roller 1.

As illustrated in FIG. 5A, the rubbing members 3 have a straight shape having a uniform outer diameter distribution in a roller shaft direction. If the rubbing members 3 have a straight shape, the rubbing members 3 desirably have a static friction coefficient $\mu s$ of approximately 0.6. The rubbing members 3 are made of a resin material having rubbing durability, such as polyacetal (polyoxymethylene (POM)). In consideration of electrostatic problems due to frictional electrification with the intermediate transfer belt 101, the resin material is given electrical conductivity. End portions of a steering roller shaft 30 have a D-cut shape and are thereby supported in a rotation-regulated manner relative to the slide bearings 4. The rubbing members 3 are also attached to the steering roller shaft 30 in a rotation-regulated manner.

The driven roller 2 is made of a cylindrical aluminum material. The driven roller 2 is supported to be rotatable about the steering roller shaft 30 by built-in bearing members. If the intermediate transfer belt 101 stretched around the steering roller 1 turns around, the driven roller 2 rotates with the intermediate transfer belt 101. The rotation of the rubbing members 3 provided at both ends of the steering roller 1 is regulated within a predetermine range. After the rubbing members 3 rotate with the intermediate transfer belt 101 in a conveyance direction by a predetermined amount, the rubbing members 3 are held not to rotate further. Both end portions therefore have extremely high resistive load against the rotation of the intermediate transfer belt 101 compared to that of the center portion.

Thus, when the intermediate transfer belt 101 turns around, the driven roller 2 of the steering roller 1 hardly rubs against the inner peripheral surface of the intermediate transfer belt 101. Meanwhile, the rubbing members 3 arranged at both end portions of the steering roller 1 rub against the intermediate transfer belt 101 with a relative speed difference and cause high frictional force on the intermediate transfer belt 101. The friction coefficients of the rubbing members 3 and the driven roller 2 were measured by a test method based on Japanese Industrial Standard (JIS) K7125: Plastics-Film and sheeting—Determination of the coefficients, using, as a test piece, a polyimide sheet, which is the material of the inner peripheral surface of the intermediate transfer belt 101.

As illustrated in FIG. 5B, the rubbing members 3 may be configured to have a tapered shape in which the outer diameter increases continuously outward in the roller shaft direction. If the rubbing members 3 have a tapered shape, the static friction coefficient $\mu s$ may be made smaller than that in the case of a straight shape.

As illustrated in FIG. 6A, the intermediate transfer belt 101 has a width greater than a width of the driven roller 2 and smaller than a sum of the widths of the driven roller 2 and the rubbing members 3 at both ends. The intermediate transfer belt 101 and the rubbing members 3 have the same overlapping widths W (hatched portions in the diagram) at both ends. Thus, the intermediate transfer belt 101 rubs against at least either of the rubbing members 3.

On the other hand, if the intermediate transfer belt 101 has a width smaller than the width of the driven roller 2 as illustrated in FIG. 6B, even if the intermediate transfer belt 101 shifts, the steering roller 1 does not tilt until the intermediate transfer belt 101 has an overlapping width with either of the rubbing members 3. Thus, the lateral movement control of the intermediate transfer belt 101 is likely to be unstable since a tilt and a lateral movement occurs abruptly at the instant when the intermediate transfer belt 101 starts to have an overlapping width with the rubbing member 3.

<Example Belt Cleaning Device>

Figure 7A:
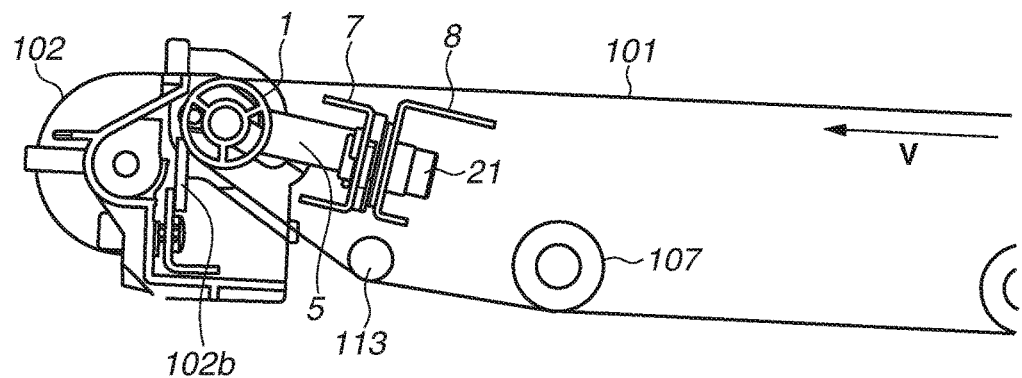
FIGS. 7A and 7B are diagrams illustrating an example configuration of a belt cleaning device.
Figure 7B:
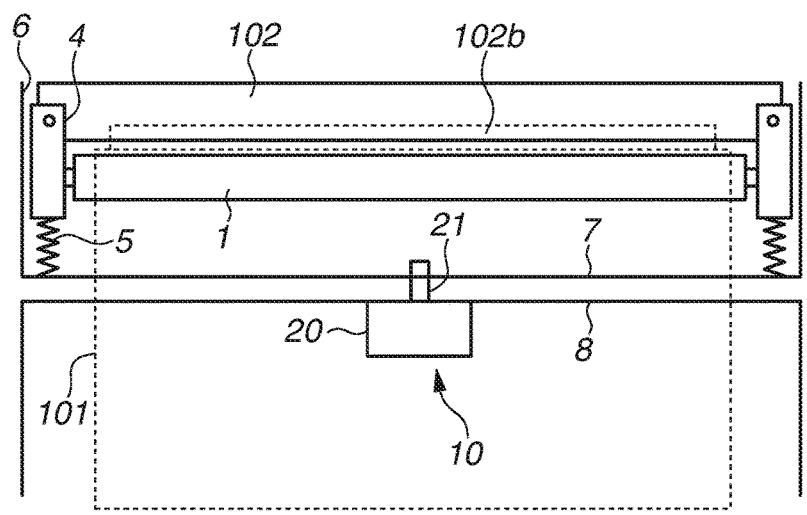

FIGS. 7A and 7B are explanatory diagrams illustrating a configuration of a belt cleaning device.

As illustrated in FIG. 7A, a belt cleaning device 102 collects transfer residual toner by rubbing a cleaning blade 102b against the intermediate transfer belt 101. The cleaning blade 102b is brought into contact with a winding area where the intermediate transfer belt 101 is wound around the steering roller 1. A tip of the cleaning blade 102b is directed in a counter direction relative to a moving direction V of the intermediate transfer belt 101. The belt cleaning device 102 brings a tip portion of the cleaning blade 102b into contact with an outer surface of the intermediate transfer belt 101, and collects transfer residual toner remaining on the intermediate transfer belt 101 without being transferred to the recording medium P. The cleaning blade 102b is made of urethane rubber. The urethane rubber has a JIS-A hardness of 75 and a thickness of 2 mm. The cleaning blade 102b has an abutting angle of 25° and an abutting pressure of 3 N/m (30 gf/cm). However, the disclosure is not limited thereto.

As illustrated in FIG. 7B, the rotation plate 7 is tiltable relative to the frame stay 8 with the steering shaft 21 at the center. End portions of the belt cleaning device 102 are attached to the slide bearings 4. The slide bearings 4 can rotatably support the end portions of the steering roller 1 and can move along the side support members 6 fixed to the rotation plate 7. The belt cleaning device 102 tilts integrally with the steering roller 1 and causes the tip of the cleaning blade 102b to be pressed there against at a constant position of the steering roller 1 all the time through the intermediate transfer belt 101. The cleaning blade 102b is arranged to always remain parallel to the steering roller 1, and secures a uniform frictional state over an entire contact length of the cleaning blade 102b with the intermediate transfer belt 101. The same contact state is maintained between the intermediate transfer belt 101 and the cleaning blade 102b to collect transfer residual toner even while the intermediate transfer belt 101 is shifted and the steering roller 1 is tilted.

Configuration of First Example Embodiment

Figure 8:
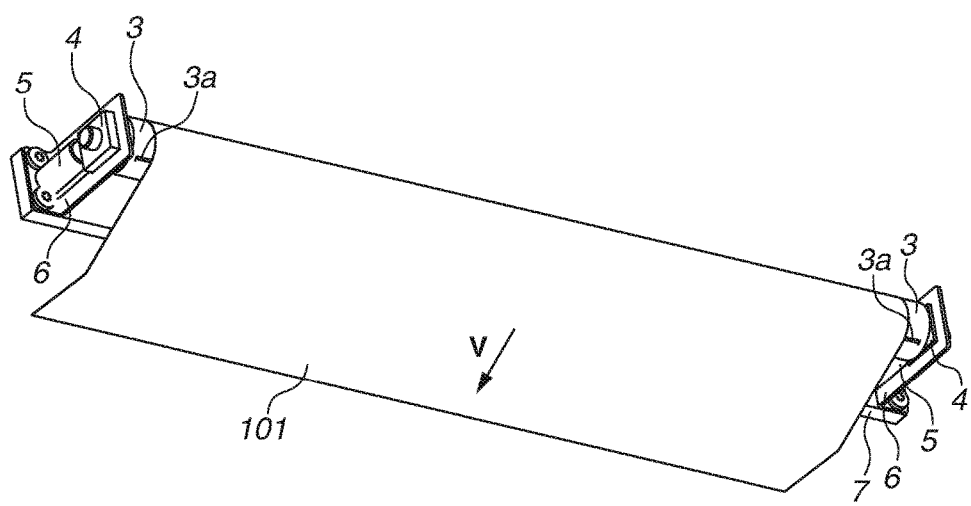
FIG. 8 is a perspective view of the steering roller and rubbing members according to a first example embodiment.
Figure 9A:
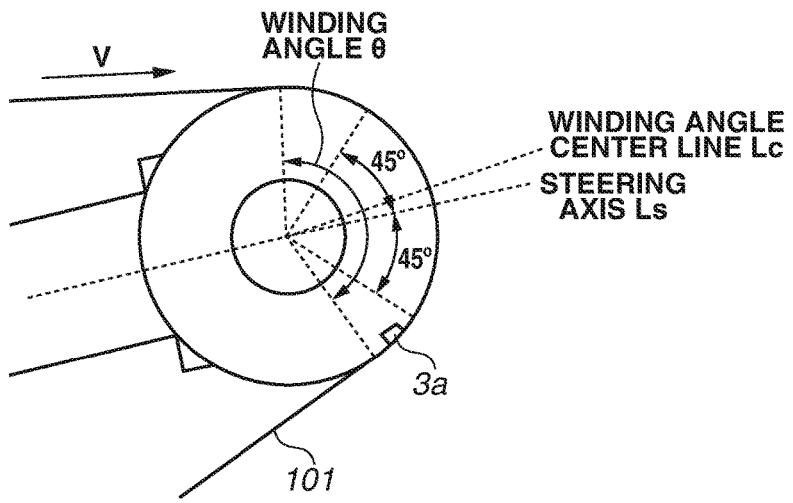
FIGS. 9A, 9B, and 9C are cross-sectional diagrams illustrating a trapping portion according to the first example embodiment.
Figure 9B:
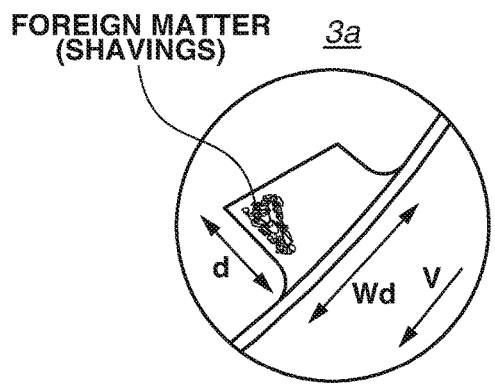

FIG. 8 is a perspective view of the steering roller 1 and the rubbing members 3 according to the first example embodiment. FIG. 9A is a cross-sectional diagram illustrating a position of a trapping portion 3a formed in each of the rubbing members 3 relative to the rotation direction of the intermediate transfer belt 101. FIG. 9B is a detailed diagram illustrating a shape of the trapping portion 3a.

As illustrated in FIG. 8, the intermediate transfer belt 101 is continuously conveyed in a direction of an arrow V during image formation. As described above, the intermediate transfer belt 101 is in a state of always having an overlapping width with the rubbing members 3 at both ends or with either one of the rubbing members 3. Therefore, the intermediate transfer belt 101 and the rubbing members 3 are in a state of continuing rubbing with a relative speed difference therebetween. As a result, if the image forming apparatus 100 is used for a long period of time, shavings due to rubbing occur between the intermediate transfer belt 101 and the rubbing members 3. An image defect can occur if such shavings are transported to the image forming units 109Y, 109M, 109C, and 109Bk.

In the present example embodiment, the trapping portion 3a for collecting shavings is formed in the surface of each of the rubbing members 3. Spreading of foreign matter (e.g. chippings, shavings) in the apparatus main body can be reduced by trapping shavings occurring from the rubbing between the rubbing members 3 and the intermediate transfer belt 101 into the trapping portions 3a.

As illustrated in FIG. 9A, each of the rubbing members 3 has the trapping portion 3a that is a recessed portion or a groove portion formed in a recessed shape. The trapping portion 3a is formed in an outer surface of the rubbing member 3 to which an inner surface of the intermediate transfer belt 101 is opposed. The trapping portion 3a is extended in the direction of the rotation axis of the steering roller 1. When viewed in the direction of the rotation axis of the steering roller 1, the trapping portion 3a is formed within the range of a winding area θ (winding angle θ) where the intermediate transfer belt 101 is wound around the rubbing member 3. In the present example embodiment, the trapping portion 3a is formed outside of the area of ±45° from a direction of an axis Ls of the steering shaft 21. In other words, the trapping portion 3a is arranged outside of the area of within ±45° in a circumferential direction of the steering roller 1 from an intersection of the axis Ls of the steering shaft 21 and the winding area θ. In the case of the autonomous steering system, a belt shift causes frictional force between the rubbing member 3 at the end and the intermediate transfer belt 101, and the steering roller 1 subject to the frictional force can tilt to cancel the shift. The frictional force for tilting the steering roller 1 is generated more in the area of approximately ±450 from the direction of the axis Ls of the steering shaft 21. Since the trapping portion 3a provided in the present example embodiment is formed outside of the area of ±45°, influence on the autonomous steering system is suppressed to be extremely small.

Since the intermediate transfer belt 101 is conveyed in the direction of the arrow V, shavings occurring from the rubbing portion 3 are also conveyed in the direction of the arrow V. Therefore, as illustrated in FIG. 9A, a larger amount of shavings can be trapped by providing the trapping portion 3a downstream in the conveyance direction relative to a winding angle center line Lc.

Figure 9C:
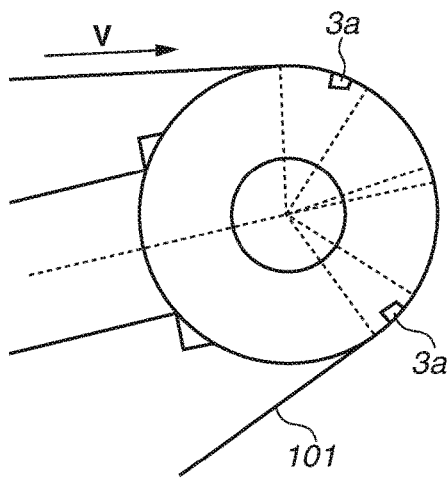

In the present example embodiment, the rubbing member 3 is described to include one trapping portion 3a formed into a recessed shape. However, the disclosure is not limited thereto. For example, as illustrated in FIG. 9C, trapping portions 3a may be provided at a plurality of positions.

As illustrated in FIG. 9B, the trapping portion 3a is formed into a recessed shape with a maximum depth d of 500 μm. The trapping portion 3a is formed to have a width Wd of 1 mm in the circumferential direction of the steering roller 1. The recessed shape is deeper on the downstream side in the rotation direction V of the intermediate transfer belt 101. The purpose thereof is to enhance an effect of stopping shavings conveyed in the rotation direction. The trapping portion 3a includes a bottom and sidewalls. The sidewalls are provided upright from the bottom and upstream and downstream in the rotation direction V of the intermediate transfer belt 101. The sidewalls are smoothly and continuously connected with the outer peripheral surface (outer surface) of the rubbing member 3. Connecting portions are round chamfered. This suppresses rubbing of the inner surface of the intermediate transfer belt 101 against edges of the sidewalls of the trapping portion 3a when the inner surface passes the trapping portion 3a. The disclosure is not limited to the above-described numerical values of the recessed shape. A recessed shape having a depth of 100 μm or more and a width of 300 μm or more can provide the effect of trapping shavings occurring between the rubbing member 3 and the intermediate transfer belt 101.

An upper limit of the width of the recessed shape is desirably ⅛ or less the length of the outer peripheral surface of the steering roller 1. This takes account of the fact that the winding angle θ is usually 180° C. at the maximum. As described above, the trapping portion 3a is formed within the range of the winding angle θ where the steering roller 1 and the rubbing member 3 come into contact with the intermediate transfer belt 101. In addition, as illustrated in FIG. 9A, the trapping portion 3a is provided outside of the area between the two lines each forming an angle of 45° to the axis Ls of the steering shaft 21 when viewed in the rotation axis direction of the steering roller 1. If the trapping portion 3a is too large, the intermediate transfer belt 101 may enter the trapping portion 3a and may come into contact with the bottom of the trapping portion 3a. Therefore, the upper limit of the width of the recessed shape can be 3 mm or less. The upper limit of the depth of the recessed shape can be 5 mm or less.

As illustrated in FIG. 10, the trapping portions 3a are provided to extend in the width direction of the intermediate transfer belt 101. The trapping portions 3a are formed in the entire area where the intermediate transfer belt 101 and the rubbing members 3 come into contact during transfer operation of the intermediate transfer belt 101. Specifically, the trapping portions 3a are grooves extended from inner end portions toward outer end portions of the rubbing members 3. The trapping portions 3a are extended outside to where the ends of the intermediate transfer belt 101 (belt ends) are located when the intermediate transfer belt 101 is moved farthest in the belt width direction (X=Xmax) during rotation control of the intermediate transfer belt 101. In FIG. 10, X=0 represents positions of the belt ends when the intermediate transfer belt 101 is positioned at the center in the belt width direction. Even if the intermediate transfer belt 101 continues rotating continuously at the position of the maximum amount of movement (X=Xmax), shavings can be trapped in the entire area in the rotation axis direction of the steering roller 1 where the rubbing members 3 and the intermediate transfer belt 101 rub against each other.

As described above, in the image forming apparatus 100 according to the present example embodiment, the trapping portions 3a formed in the rubbing members 3 provided at the ends of the steering roller 1 trap foreign matter such as shavings occurring from the rubbing members 3 at the ends of the steering roller 1. This can prevent the spreading of the foreign matter to other places inside the image forming apparatus 100 and can prevent a problem of the foreign matter being transported to the image forming units 109Y, 109M, 109C, and 109Bk and causes an image defect.

Figure 11:
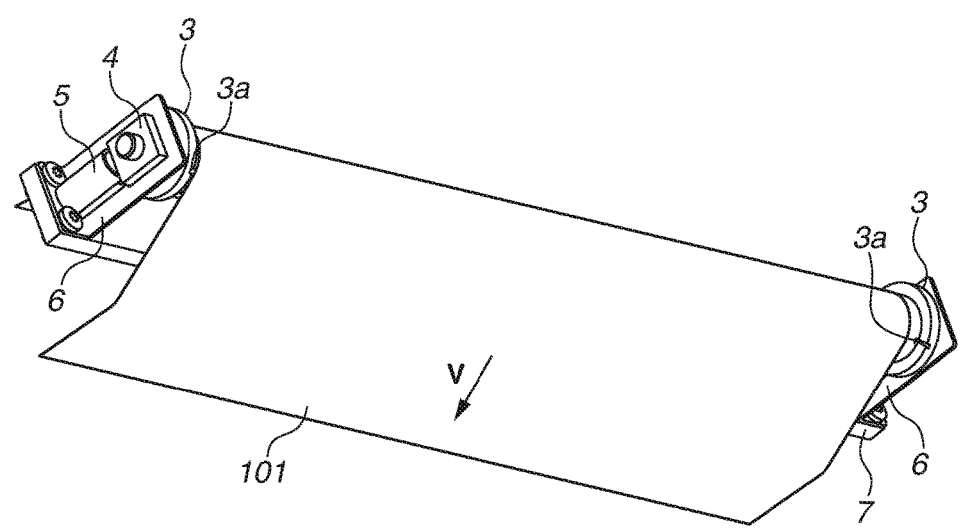
FIG. 11 is a perspective view of a steering roller and rubbing members according to a second example embodiment.

An image forming apparatus according to a second example embodiment is different from that of the first example embodiment in the shape of the rubbing members 3. As illustrated in FIG. 11, the rubbing members 3 according to the present example embodiment include flange portions 3b at the axial ends of the steering roller 1. The flange portions 3b are provided so as to protrude in a radial direction of the steering roller 1 over the entire circumference of the steering roller 1. The flange portions 3b are provided to be capable of rubbing against edge portions of the intermediate transfer belt 101. The flange portions 3b are configured so that if the intermediate transfer belt 101 shifts during rotation, the end portion (edge portion) of the intermediate transfer belt 101 on that side comes into contact with the flange portion 3b provided on the corresponding rubbing member 3. The rotation of the rubbing members 3 provided at both ends of the steering roller 1 is regulated within a predetermined range as in the first example embodiment. Therefore, the end portions of the intermediate transfer belt 101 and the flange portions 3b of the rubbing members 3 are in a state of continuing rubbing with a relative speed difference therebetween. As a result, if the image forming apparatus 100 is used for a long period of time, shavings due to rubbing occur between the end portions of the intermediate transfer belt 101 and the flange portions 3b of the rubbing members 3. An image defect can occur if the shavings are transported to the image forming units 109Y, 109M, 109C, and 109Bk.

In the present example embodiment, trapping portions 3a for trapping the shavings are formed in the flange portions 3b of the rubbing members 3. The position of each of the trapping portions 3a provided in the present example embodiment relative to the winding angle θ and the depth and width of the trapping portion 3a are similar to those in the first example embodiment.

In the present example embodiment, each of the rubbing members 3 is described to include one trapping portion 3a, which is formed in a recessed shape at a position where the rubbing member 3 comes into contact with the end portion of the intermediate transfer belt 101. However, the disclosure is not limited thereto. As described in the first example embodiment, the rubbing member 3 may also include a trapping portion 3a at a position opposed to an inner periphery side of the intermediate transfer belt 101. The rubbing member 3 may also include a plurality of trapping portions 3a.

As described above, in the image forming apparatus 100 according to the present example embodiment, the trapping portions 3a formed in the flange portions 3b of the rubbing members 3 provided at the ends of the steering roller 1 trap shavings occurring between the end portions of the intermediate transfer belt 101 and the flange portions 3b of the rubbing members 3. This can prevent the spreading of the shavings to other places inside the image forming apparatus 100 and can prevent the problem of foreign matter being transported to the image forming units 109Y, 109M, 109C, and 109Bk and causing an image defect.

The present example embodiment has been described by using, as an example, the image forming apparatus 100 that includes a belt conveyance device for conveying the intermediate transfer belt 101. However, the present example embodiment is not limited thereto. For example, the present example embodiment can also be applied to a belt conveyance device of a fixing belt for fixing an image to a recording material and a belt conveyance device of a secondary transfer belt for secondarily transferring an image to a recording material.

In the present example embodiment, the trapping portions 3a have the shape of a groove continuously extending in the width direction of the intermediate transfer belt 101. However, the trapping portions 3a do not need to be continuous in the width direction of the intermediate transfer belt 101. For example, an area where a trapping portion 3a is formed and an area where no trapping portion 3a is formed may be alternately arranged in the width direction of the intermediate transfer belt 101. There may be provided a first trapping part, in which an area where a trapping portion 3a is formed and an area where no trapping portion 3a is formed are alternately arranged, and a second trapping part in the width direction of the intermediate transfer belt 101. The second trapping part may be arranged to an area correspond to where the first trapping part is not provided. In such a manner, the second trapping part can trap shavings in the area where the first trapping part is unable to trap shavings.

An example embodiment of the disclosure can provide a belt conveyance device and an image forming apparatus that can suppress spreading of shavings, if any, occurring between rubbing members provided at both ends of a steering roller and a belt member.

While the disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2017-186697, filed Sep. 27, 2017, which is hereby incorporated by reference herein in its entirety.

What is claimed is:

1. A belt conveyance device comprising:
an endless belt member configured to turn around; and
a steering roller configured to be tiltable and stretch the belt member, the steering roller including a roller configured to be rotatable with the belt member and a rubbing member configured to rub against the belt member to apply frictional force to the belt member, rotation of the rubbing member being regulated at both ends of the steering roller, the steering roller being tilted by frictional force acting on the rubbing member from the belt member,
wherein the rubbing member includes a recessed portion formed along an axial direction of the steering roller in an area opposing an inner peripheral surface of the belt member, and
wherein a width of the recessed portion with respect to a circumferential direction of the steering roller is 300 μm or more and a depth of the recessed portion is 100 μm or more.

2. The belt conveyance device according to claim 1, wherein the width of the recessed portion is 3 mm or less and the depth of the recessed portion is 5 mm or less.

3. The belt conveyance device according to claim 1,
wherein the steering roller is supported to be tiltable by rotating about a steering shaft crossing a rotation axis of the steering roller, and
wherein the recessed portion is arranged, in a cross section orthogonal to the rotation axis of the steering roller, on an outer side of an area of within ±45° in a circumferential direction of the steering roller from an intersection of an axis of the steering shaft and the rubbing member.

4. The belt conveyance device according to claim 1,
wherein the steering roller is supported to be tiltable by rotating about a steering shaft crossing a rotation axis of the steering roller, and
wherein at least one recessed portion is arranged, in a cross section orthogonal to the rotation axis of the steering roller, in an area downstream in a conveyance direction of the belt member with respect to an intersection of an axis of the steering shaft and the rubbing member.

5. The belt conveyance device according to claim 1, wherein the recessed portion is shaped so as to increase in depth toward downstream in a rotation direction of the belt member.

6. The belt conveyance device according to claim 1,
wherein the recessed portion is extended from an inner end portion of the rubbing member toward an outer end portion of the rubbing member in a width direction of the belt member, and
wherein the recessed portion is extended to an outside of a position where an end of the belt member lies when the belt member moves farthest in the width direction during rotational control of the belt member.

7. The belt conveyance device according to claim 1, wherein the belt member is an intermediate transfer belt onto which a toner image is transferred.

8. An image forming apparatus comprising:
an endless belt member configured to bear an image and turn around; and
a steering roller configured to be tiltable and stretch the belt member, the steering roller including a roller configured to be rotatable with the belt member and a rubbing member configured to rub against the belt member to apply frictional force to the belt member, rotation of the rubbing member being regulated at both ends of the steering roller, the steering roller being tilted by frictional force acting on the rubbing member from the belt member,
wherein the rubbing member includes a recessed portion formed along an axial direction of the steering roller in an area opposed to an inner peripheral surface of the belt member, and
wherein a width of the recessed portion with respect to a circumferential direction of the steering roller is 300 μm or more and a depth of the recessed portion is 100 μm or more.

* * * * *